United States Patent [19]

Fischer et al.

[11] E Re. 31,595

[45] Reissued Jun. 5, 1984

[54] ELECTRIC POWER CONTROLLERS

[75] Inventors: Karl Fischer, Oberderdingen; Robert Kicherer, Knittlingen; Gerhard Goessler, Oberdingen, all of Fed. Rep. of Germany

[73] Assignee: E.G.O. Regeltechnik GmbH, Fed. Rep. of Germany

[21] Appl. No.: 383,199

[22] Filed: May 28, 1982

Related U.S. Patent Documents

Reissue of:

[64] Patent No.: 4,206,344
Issued: Jun. 3, 1980
Appl. No.: 802,596
Filed: Jun. 2, 1977

[30] Foreign Application Priority Data

Jun. 9, 1976 [DE] Fed. Rep. of Germany ..... 2625715
Jun. 9, 1976 [DE] Fed. Rep. of Germany ..... 2625716

[51] Int. Cl.[3] ..... H05B 1/02; H01H 61/02

[52] U.S. Cl. ..... 219/507; 219/511; 219/494; 337/298; 337/99

[58] Field of Search ..... 219/490, 491, 493, 494, 219/501, 488, 508-511; 337/99-102, 62-64, 305, 298; 200/16 A, 153 LB

[56] References Cited

U.S. PATENT DOCUMENTS

| | | | |
|---|---|---|---|
| 2,284,825 | 6/1942 | Jennings et al. | 337/101 |
| 2,705,276 | 3/1955 | Wise | 219/488 |
| 2,792,533 | 5/1957 | Richards | 337/101 |
| 3,005,080 | 10/1961 | Bletz | 337/99 |
| 3,238,335 | 3/1966 | Randolf | 337/101 |
| 3,486,152 | 12/1969 | Alban | 337/101 |
| 3,836,742 | 9/1974 | Soos | 200/153 LB |
| 3,902,151 | 8/1975 | Hall et al. | 337/101 |
| 4,064,381 | 12/1977 | Mullen et al. | 200/16 A |
| 4,069,464 | 1/1978 | Bollinger, Jr. et al. | 337/102 |

FOREIGN PATENT DOCUMENTS

| | | | |
|---|---|---|---|
| 616739 | 3/1961 | Canada | 337/100 |
| 1128012 | 4/1962 | Fed. Rep. of Germany | 337/101 |

*Primary Examiner*—M. H. Paschall
*Attorney, Agent, or Firm*—Steele, Gould & Fried

[57] ABSTRACT

A power controller for controlling the intermittent supply of current to a load, such as a cooker hotplate, has a pivotally mounted snap switch controlled by a heated bimetal member which is heated in dependence upon the connected power. A compensating bimetal strip, for taking ambient temperature into account, is arranged on the snap switch and parallel thereto. A control cam acts on the free end of the compensating bimetal strip. The latter is shielded from the heat of the heated bimetal member.

4 Claims, 4 Drawing Figures

ELECTRIC POWER CONTROLLERS

Matter enclosed in heavy brackets [ ] appears in the original patent but forms no part of this reissue specification; matter printed in italics indicates the additions made by reissue.

The invention relates to a power controller for the controllable supply of electrical power in power pulses to a load, having a working bimetallic member, which is heated in dependence upon the connected power and which acts upon a snap switch.

A power controller is described in the publication "Conti-Elektro-Berichte" (Conti-Electro-Reports), October/December 1959, Pages 285 to 290. The power controller illustrated in FIG. 3 on page 285 of this publication has a working bimetal strip to which a compensating bimetal strip is connected at right angles. In the region of the internal corner between these two bimetal strips is pivotably mounted on a pin disposed in the switch socket. The compensating bimetal strip acts upon an encapsulated switch. Adjustment is effected by means of a control cam which acts upon the free end of the working bimetal strip by way of a roller, a separately mounted lever and an adjusting screw. A mechanical switch with two contact springs is disposed opposite the bimetal strip.

For structural reasons the bimetal strip of such a controller can only have a length which is not much longer than half the switch dimensions. Consequently its thickness dimension and its working travel are then also smaller. In addition, the heat of the bimetal strip is transferred to the directly attached compensating bimetal strip so that this compensating bimetal strip operates constantly in a range of relatively high temperature and its actual object, the taking into account the influence of ambient temperature, can only be partially achieved. Adjusting the working region by pivoting the working bimetal strip with the aid of a lever mechanism is a complicated task and leads to the reproducibility of the individual part loads being inaccurate. In particular, this reproducibility is poor in the critical upper and lower power ranges. A part load of, for example, 5%, which is necessary to be able to heat up an electric hotplate, cannot be positively controlled with such a controller.

Power controllers with a pivotable snap switch have been described, for example, in German Patent specification No. 16 40 084. The bimetal strip therein is directly connected to the snap spring and the control is effected by way of a cam disc and a lever having a stop whose distance relative to the working bimetal strip is adjusted during the adjusting process. This system permits the use of only relatively thin and labile bimetal strips and presents problems with the addition of a compensation device, not envisaged in this publication.

An object of the invention is to provide a power controller which is easy to manufacture on a small scale and enables the power settings to be reproduced very well despite relatively low requirements being set on the precision of the construction. In particular, the compensation for the ambient temperature is to be reliably achieved.

According to the present invention, a power controller for the controllably intermittant supply of electrical power to a load, comprises a pivotably mounted bimetal member, means for heating the latter in dependence upon the connected power, a pivotally mounted snap switch for the load current, the bimetal housing a lever which extends at an angle thereto and which acts upon the snap switch, a compensating bimetal strip secured to the snap switch and extends substantially parallel to the snap switch at one side thereof, and a control cam which acts upon the free end of the compensating bimetal strip.

A compensating bimetal/snap switch unit is therefore formed which is jointly pivotable. The compensating bimetal strip is only influenced to a very small extent by the temperature of the working bimetal member and can therefore achieve its task of compensation. Moreover, it is also heat-shielded by the snap switch lying parallel thereto. It may be short and relatively strong. However, the working bimetal member always remains in its position and only one of its ends pivots towards the snap switch in accordance with the extent of its heating.

For this purpose, the bimetal member is preferably L-shaped, the longer bimetal limb being provided with a heating device and being possibly supported on the housing by way of an adjusting screw under spring force.

According to a further feature of the invention, provision is made for a diode to be provided in a controller to be operated with alternating current, the diode being connected in circuit with the heating device for the bimetal member by a switch, actuable by the adjusting shaft, only in the upper power range and being disconnected in the lower power range.

A relatively large-dimensioned bimetal heating device, which is consequently less influenced by the wire gauge, may therefore be provided. In the lower power range this heating device is fully effective so that the bimetal member quickly heats up, resulting in the overall power being quickly disconnected. The resultant short relative connection period also keeps the heating of the switch within limits since the bimetal control heating device is only switched on during the connection of the load. However, in the upper power range which may begin, for example, at 20% relative connection period, the diode is connected in series with the bimetal heating device. The heating device of the bimetal thereby only ever receives a half-wave of the alternating current and thus only half the power. Consequently the development of heat is less and the higher outputs are easier to control. In this region, the development of heat would be particularly unwelcome because there is a long connection period here also for the bimetal heating device. In addition, the temperatures at the bimetal are kept low and the entire switch heating remains low so that the ambient temperature can also be compensated for advantageously.

It is particularly preferable for the diode at the rear side of the housing of the power control apparatus remote from the operated side to be disposed directly on the switch which bridges it. Such an embodiment keeps the expense for the arrangement and switching in circuit of the diode very low and the diode is disposed in the cool external region of the switch. The switch connecting the diode may be a simple creeping switch which does not need any snap mechanism in the adjusting shaft.

The invention will be further described, by way of example, with reference to the accompanying drawings, in which.

Figure 1:
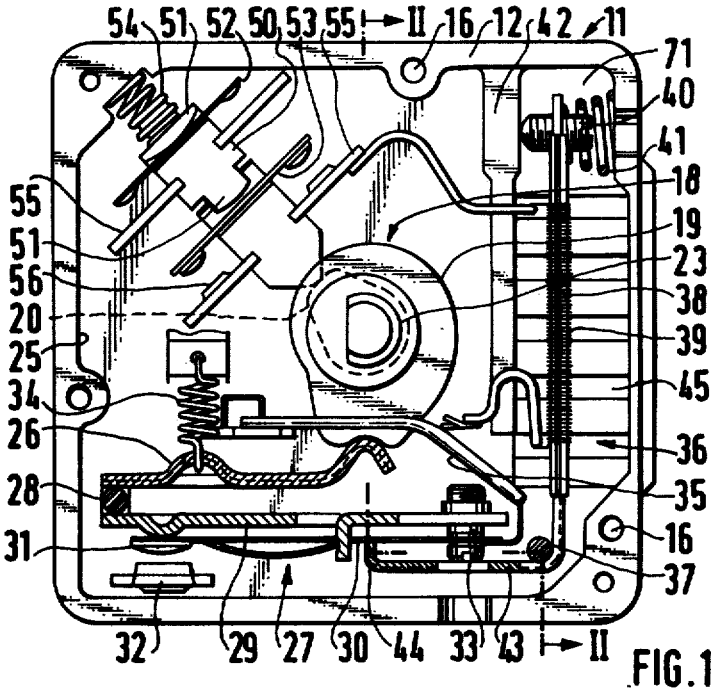
FIG. 1 is a plan view of one embodiment of a power controller according to the invention, seen from the operated side, with a closer cover removed.
Figure 2:
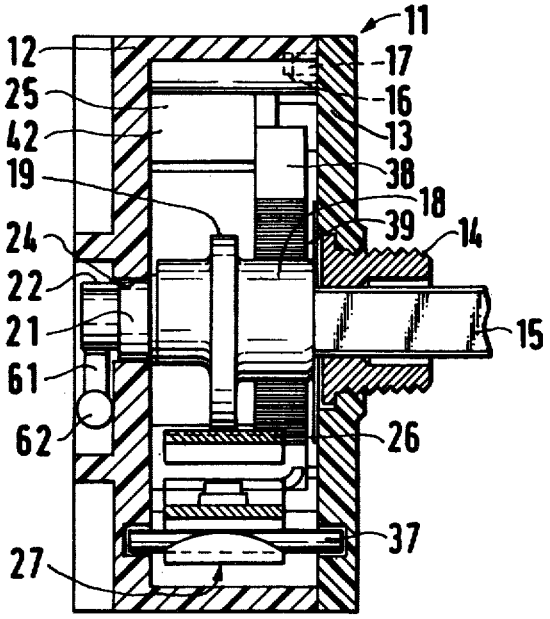
FIG. 2 is a section along the line II—II in FIG. 1.
Figure 3:
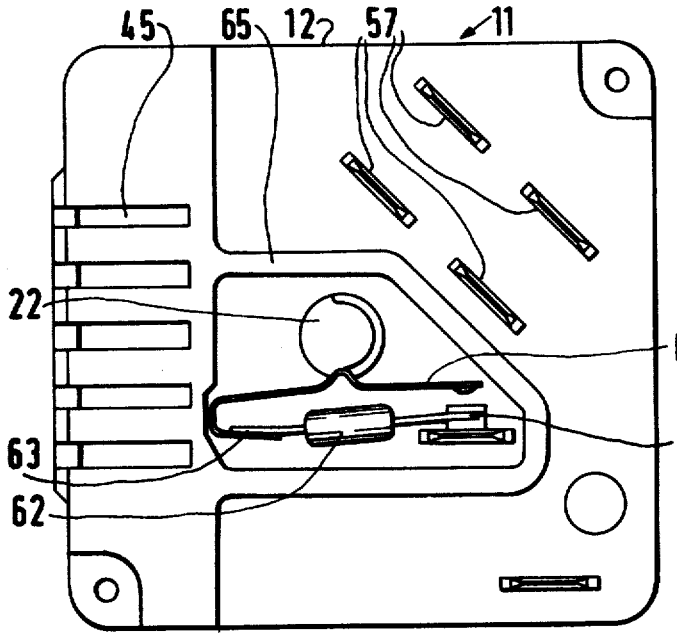
FIG. 3 is a rear view of the power controller of FIG. 2, seen from the left.
Figure 4:
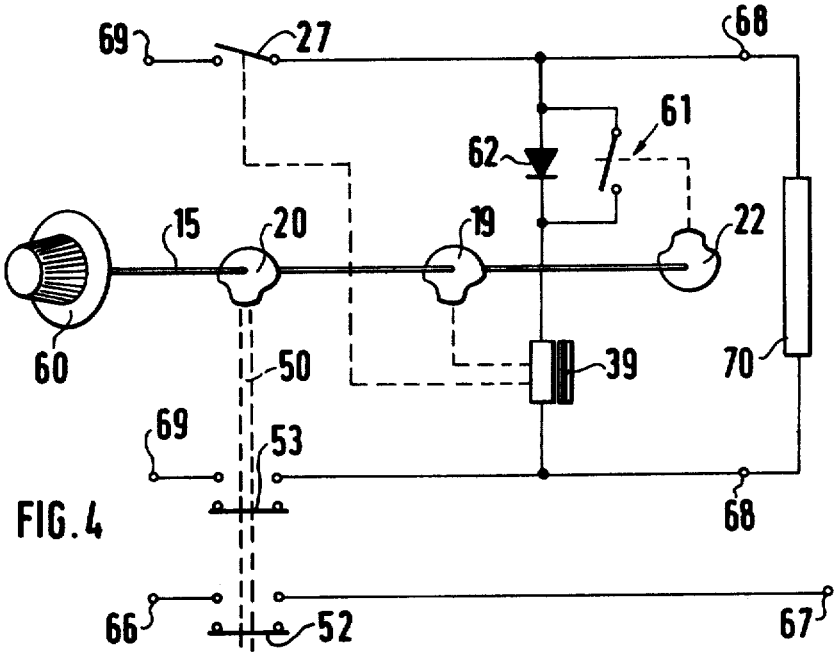
FIG. 4 is a schematic circuit diagram of the power controller shown in FIGS. 1 to 3.

One embodiment of power controller 11 is shown in FIGS. 1 to 3. It has a rear housing part 12 (or housing part remote from the operated side) made of plastics material and in the form of a rectangular or preferably square block with an internal cavity 25. This cavity is sealed by a plate-shaped cover 13 which faces towards the operated side and has centering dowels 17 which engage in centering recesses 16 on the housing part 12. A screw-threaded bush 14 is secured to the cover 13 and an adjusting shaft 15, which carries an adjusting knob 60 indicated in FIG. 4, protrudes through the threaded bush. The adjusting shaft 15 protrudes into a central hole 23 in a control body 18 which is made of insulating material and carries on its outer periphery a control cam 19 and a switching cam 20. At its end remote from the operated side, the control body 18 has a bearing pin 21 which protrudes through an aperture 24 in the rear housing part 12 and comprises a further switching cam 22 on the rear side of the housing part 12.

A compensating bimetal strip 26 co-operates with the control cam 19, this compensating bimetal strip being in the form of a transmission lever which has a front curved end by which the bimetal strip 26 is pressed against the control cam 19 under the force of a spring 34. The compensating bimetal strip 26 is relatively thick and rigid and is pivotably mounted by its end opposite the front curved end by which it abuts the control cam 19 by means of a pivot 28. At this end, the compensating bimetal strip is attached to a switch carrier 29 of a snap switch 27, so that the compensating bimetal strip is parallel to the switch carrier 29 and is slightly spaced therefrom. The snap switch/compensating bimetal unit is therefore pivotable as a whole about the pivot 28.

Disposed on the switch carrier 29 is a snap spring which is supported in the conventional manner on a support bearing and which has a bowed resilient tongue under buckling stress. The snap spring carries at its free end its contact 31, which co-operates with a fixed counter-contact 32, and is fixed at its opposite end by an adjusting screw 33, which has an annular groove into which a fork-like end of the snap spring is inserted. A terminal end of an electrical supply line 35 is welded to one fork end whereby the snap spring is electrically connected to a terminal 68 for a load 70, such as a cooker hotplate element.

The snap switch 27 is actuated by a bimetallic member 36 which is L-shaped. This L is completely made of bimetal strip and a pivot 37 is mounted in the internal angle of the L, this pivot, like the pivot 28, being advantageously journalled in recesses which are located respectively in the housing part 12 and the cover 13 and in which the pivot ends are received when these two housing parts are assembled together.

The long, heated limb 38 of the bimetallic member 36 carries a heating winding or coil 39 which is supplied with current by way of two supply leads. An adjusting screw 40 which is pressed by a spring 41 against an inner intermediate wall 42 of the housing part 12 is screwed into the free end of the heated limb 38.

At the end of the short limb 43 of the bimetallic member 36 there is a cranked portion 44 which presses against the actuating point of the snap spring 30.

The heated limb 38 of the bimetallic member 36 is located in a chamber 71 which is partially sealed off by the intermediate wall 42 and is ventilated by ventilation slots 45.

It can be seen that the snap switch/compensation bimetal unit, on the one hand, and the bimetallic member 36, on the other hand, are disposed at an angle to one another and enclose the control body 18 therebetween. In the corner of the housing cavity 25 opposite this angle, a mechanical switch is disposed which has a switch slide 50 actuated by the switching cam 20. This switch slide 50 is made of plastics material and has the form of a rectangular rod, one of whose ends is rounded off to co-operate with the switching cam 20 and a compression spring 54 acts upon its other end. The switch slide 50 extends substantially diagonally so that it can have the greatest possible length with the smallest space required.

On its upper and lower face, the switch slide has projections 51 which form abutments for contract arms 52, 53 which are pushed onto the switch slide and protrude beyond it on both sides. The switch slide 50 preferably comprises an insulating member so as to be able to push up the contact arms and secure them by snapping open. Each contact arm carries a contact on each of its two ends.

The switch slide 50 is guided by guides 55 which have the form of metal plates which protrude from the base of the housing part 12 and are directed at right angles to the switch slide. Four guides 55 are provided, each two of which lie opposite one another. They guide the switch slide and partially overlap it. Some of these guides 55 carry fixed contacts 56 and the guides 55 protrude through the base of the housing part 12 to form connection lugs of the AMP plug-in lug type on the rear side.

The rear side of the power controller 11 can be seen in FIG. 3. This shows that the switching cam 22 co-operates with a switch 61, which is of very small and easy construction, in the form of a contact spring which is designed to short-circuit a diode 62. In this case, the diode is soldered by its connections 63, 64 directly onto the associated connecting plug or the contact spring, and the contact spring is embraced by the connection 63 and can short-circuit the diode 62 by touching its connection 64.

The power controller operates as follows:

In FIG. 1, the disconnected state is shown wherein the switching cam 20 has pressed the switch slide 50 back against the force of the compression spring 54 and has thus removed the contact arm 52 for the signal pilot light contact and the contact arm 53 for the disconnection of the second pole from the appropriate fixed contacts. When the control body 18 or the adjusting shaft is in this position, the compensating bimetal strip 26 is located in a recess in the control cam 19 so that the control body is positively held in this "off" position.

When the "energy regulator" is connected (by turning the control body 18 in a clockwise direction), the control cam 20 first of all releases the control slide 50 which, under the force of the spring 54, applies its contact arms 52, 53 which are at least partially resilient against the guides 55 such that they are bridged. On the one hand, therefore, the signal contact line 66, 67 is closed and, on the other hand, one pole of the load 70, for example the heating element of an electric hotplate, is closed.

Because of the action of the spring 34, the compensating bimetal/snap switch unit pivots into its position which corresponds to the respective position of the control cam 19. The contacts 31 and 32 are closed, so that the bimetallic member 36 is heated by its heating winding 39. The switch 61 is closed in the lower power range, for example when the adjusting shaft is in a position corresponding to power values between 5 and 20% to the total power. With a low set power, therefore, the diode 62 is bridged so that the full heating power of the heating winding 39 is effective.

Consequently, the limb 38 of the bimetallic member 36 deflects relatively quickly and presses upon the snap switch in the disconnecting direction by way of the short limb 43 and the cranked portion 44, so that this snap switch is opened again after a relatively short time.

After the bimetallic member has cooled down, the snap switch 27 re-closes and the working process starts again. In the upper operating range, on the one hand, the compensating bimetal/snap switch unit is swivelled further in an anti-clockwise direction and, on the other hand, the diode is effective because of the opening of the switch 61. The heating winding 39 is therefore only operated with a respective half-wave of the alternating current, i.e. with half the heating power. The bimetal member therefore needs substantially longer to be deflected to such an extent that it can open the snap switch and thus disconnect the power supply to the load 70. At the very high temperatures of the bimetal member, the cooling down process is also effected more quickly so that a longer relative connection period is ensured.

The power controller as described and illustrated has numerous advantages: Despite its clear and reliable construction, it can be produced at relatively low building cost and operates with relatively large paths and forces for the switching process. In particular, the high forces are essential. They are obtained because of the rather large dimensions of the bimetal member. Because of the favourable structure, the working bimetal member may be rather long and the compensation bimetal strip may be rather short and strong. The entire system is positively moved by the springs 34, 41 into a specific position so that there is only one point at which play may occur, namely the point of contact between the snap spring 30 and the bowed portion 44 of the working bimetal member 36.

There is a further advantage in constructing the bimetal member 36 as an L-shaped member made from bimetal strip. Normally it is very difficult to compensate such a controller by a compensating bimetal strip because the two bimetal strips operate within different temperature ranges. The deflection path of a bimetal strip per unit of temperature does, however, decrease with rising temperature so that the compensation can only ever be accurate for one working range. The bimetal member described here, however, has, so to speak, a double heating device. The short limb 43 runs parallel to the snap spring 30 at a relatively small distance therefrom. This spring is supplied with current by way of the supply line 35 and is relatively thin. It is therefore heated when current flows through it, even though to a certain extent. This heat additionally heats the short limb 43, but noticeably only at higher stages because, otherwise, the snap spring would hardly rise above ambient temperature. However, the negative effect of the deflection path, which is regressive with the temperature, is thereby compensated for or counteracts this negative phenomenon.

Accordingly, substantially stepless manual control is provided over all control ranges. Although a small "step" occurs when the diode is switched on or off, the effect is diminished by a corresponding slope in the cam, as shown in FIG. 1.

The compensating bimetal strip is, however, shielded from the temperature as much as possible. It is perpendicular to the working bimetal member 36 and has no heat conductive connection therewith. It is also largely shielded relative to the hot chamber by the intermediate wall 42. It is protected from the temperature produced by the snap spring by the switch carrier 29. This arrangement therefore ensures that the compensating bimetal strip can actually fulfil the purpose for which it is intended, namely to effect a compensation for the variable ambient temperature, and must not operate in a temperature which is substantially high relative to the surroundings.

The working bimetal member and the compensating bimetal/snap spring unit take up two sides of the switch housing so that one corner remains entirely free for the switch 50 to 56. The arrangement of this very small-built switch in the same radial plane as the other parts of the power controller enables this controller to be produced with a very small structural dimension. The depth in the direction of the adjusting shaft may, for example, be less than 25 mm so that it is also possible to install it with a vertical shaft in very flat cooking troughs.

The behaviour of the power controller is very positively influenced by the diode 62. The middle power range is rarely a problem for such controller. The real problem lies in the upper power range and in particular, however, in the lower power range. In the case of today's hotplates with relatively high power, however, the lower power range is in fact critical when it is also desirable to heat up the hotplate. Outputs of up to 5% of the total power and below (100 W with a 2000 W hotplate) must be positively controlled. However, this requires very high outputs on the bimetal member because this has to react very quickly. These high outputs would, however, not only heat the controller very intensely in the higher power range and use energy, but also raise the temperatures at the bimetal member inadmissibly. This problem can be easily solved by the advantageous no-loss regulating down of the bimetal heating power, consequently without any lost heat, by means of the diode. The high power, for which the bimetal heating winding is designed, is no disadvantage because this is only ever used in the lower power range and the relative connection periods there are of course only very short. The heating of the controller by the heating winding 39 is therefore very low. Conversely, the power in the high power range is limited by the diode so that the heating of the switch also remains within limits during the relatively long connection periods there. Another advantage is that the heating winding 39 may be simply constructed. If it was desirable to make the power less, then problems would arise because the resistance wires for the low outputs would become very thin with mains voltage and especially in the case of higher mains voltages, thereby also causing the operational reliability to suffer.

We claim:

[1. A power controller for the controllable supply of electrical power intermittently to a load, comprising:

a housing;

a snap switch having a snap switch carrier on which a snap spring, bearing a switching contact, is mounted, said snap switch carrier being pivotably mounted on a fulcrum point in said housing;

an L-shaped bimetal member pivotally mounted in said housing and having a lever by which it acts on said snap switch, said lever extending at an angle to said bimetal member and substantially parallel to said snap switch carrier;

means for heating said bimetal member in dependence upon the power supplied to said load via said snap switch;

a compensation bimetal strip secured to said snap switch carrier at the fulcrum point side thereof and extending substantially parallel thereto; and, control cam means acting upon a free end of said compensation bimetal strip, said bimetal member and said snap switch carrier forming an L-shaped arrangement running along two sides of the housing, said control cam means being arranged in the middle area of the housing and inside the angle of said L-shaped arrangement.]

[2. A controller according to claim 1, in which said L-shaped bimetallic member and has a longer bimetallic limb on which said heating means is provided, said lever being the shorter limb of said L-shaped member.]

[3. A controller according to claim 2, in which the shorter limb of said bimetal member is also bimetallic and extends parallel to said snap spring, the current supply to said switching contact being effected by way of said snap spring.]

[4. A controller according to claim 1, in which said heating means for said bimetal member is connected in parallel with said load.]

[5. A controller according to claim 1, further comprising an adjusting screw for supporting said snap spring on the side remote from said switching contact of the snap spring and having a notch by which it guides said snap spring.]

[6. A controller according to claim 2 in which said housing includes a compartment which is at least partially heat protected with respect to said compensation bimetal strip and said snap switch, said longer metallic limb and said heating means being located in said compartment.]

[7. A controller according to claim 1, in which respective pivots are provided for the pivotal mounting of said snap switch and said bimetallic member, and in which said housing comprises two parts having holes therein in which a respective end of each of said pivots is received.]

[8. A controller according to claim 7, in which one of the housing parts has a cavity which accommodates said snap switch, said bimetal member, said heating means and said compensating bimetal strip, and the other of said housing parts comprising a cover which substantially closes off said cavity.]

[9. A controller according to claim 1, in which said control cam means has a rotatable adjusting shaft and in which a mechanical mains switch is arranged in said housing substantially in the same plane as said snap switch and said bimetal member.]

[10. A controller according to claim 9, in which said mains switch has a switch slide and transversely extending contact arms thereon and in which said control cam means includes a cam for actuating said switch slide.]

[11. A controller according to claim 10, in which said housing is rectangular or square and in which said switch slide lies diagonally in a corner of said housing.]

[12. A controller according to claim 10 in which said switch slide comprises insulating material and in which at least four metallic guides arranged opposite one another in pairs are provided in said housing and extend at right angles to said switch slide for guiding said switch slide, said guides defining thereon fixed contacts with which said contact arms co-operate and protruding through said housing to define connecting tabs.]

[13. A controller according to claim 1, in which said control cam means combines a control body which has a control cam thereon, and an adjusting shaft which is received in a hole in said central body and protrudes from the housing at the operating side thereof, and in which the housing has a bearing opening at its side remote from the operating side and said control body has an integrally moulded bearing pin which is journalled in said bearing opening.]

14. [A controller according to claim 1, which is] *A power controller for the controllable supply of electrical power intermittently to a load, comprising:*

*a housing;*

*a snap switch having a snap switch carrier on which a snap spring, bearing a switching contact, is mounted, said snaps with carrier being pivotably mounted on a fulcrum point in said housing;*

*an L-shaped bimetal member pivotally mounted in said housing and having a lever by which it acts on said snap switch, said lever extending at an angle to said bimetal member and substantially parallel to said snap switch carrier;*

*means for heating said bimetal member in dependence upon the power supplied to said load via said snap switch;*

*a compensation bimetal strip secured to said snap switch carrier at the fulcrum point side thereof and extending substantially parallel thereto;*

*control cam means acting upon a free end of said compensation bimetal strip, said bimetal member and said snap switch carrier forming an L-shaped arrangement running along two sides of the housing, said control cam means being arranged in the middle area of the housing and inside the angle of said L-shaped arrangement; and,*

*said controller being* adapted to operate with alternating current and [which] further [comprises] *comprising* a diode and auxiliary switch means actuable by said control cam means for connecting said diode in circuit with said heating means for said bimetal member, only in an upper power range but not in a lower power range.

[15. A controller according to claim 2 in which an adjusting screw is associated with said longer limb and spring means is provided for biassing said longer limb against said housing via said adjusting screw.]

[16. A controller according to claim 6 in which said compartment is provided with heat shield means.]

[17. A controller according to claim 6 in which said compartment is provided with ventilating means.]

18. A controller according to claim 14 in which said diode is located on a rear side of said housing remote from the opening side thereof and is disposed directly on said auxiliary switch means.

19. A controller according to claim 18 in which said control cam means combines a control body which has a control cam thereon, and an adjusting shaft which is received in a hole in said control body and protrudes from the housing at the operating side thereof, and in which the housing has a bearing opening at its side remote from the operating side and said control body has an integrally moulded bearing pin which is journalled in said bearing opening.

20. A controller according to claim 19, in which said bearing pin on said control body defines thereon a switching cam for said auxiliary switch means.

* * * * *

UNITED STATES PATENT AND TRADEMARK OFFICE

CERTIFICATE OF CORRECTION

PATENT NO. : RE. 31,595

DATED : June 5, 1984

INVENTOR(S) : Fischer et al.

It is certified that error appears in the above-identified patent and that said Letters Patent is hereby corrected as shown below:

Col. 4, line 23, "contract" should be --contact--.
Col. 5, line 11, "to" should be --of--.
Col. 8, line 15, "central" should be --control--.
Col. 8, line 64, "opening" should be --operating--.

Signed and Sealed this

*Fifteenth* Day of *January 1985*

[SEAL]

*Attest:*

*Attesting Officer*

GERALD J. MOSSINGHOFF

*Commissioner of Patents and Trademarks*